(12) United States Patent
Bereuter et al.

(10) Patent No.: US 7,901,202 B2
(45) Date of Patent: Mar. 8, 2011

(54) INJECTION-MOLDING TOOL

(75) Inventors: Klaus Bereuter, Dornbirn (AT); Franz Helth, Hohenems (AT)

(73) Assignee: z-werkzeugbau-GmbH, Dornbirn (AT)

( * ) Notice: Subject to any disclaimer, the term of this patent is extended or adjusted under 35 U.S.C. 154(b) by 182 days.

(21) Appl. No.: 12/288,650

(22) Filed: Oct. 22, 2008

(65) Prior Publication Data

US 2009/0104306 A1    Apr. 23, 2009

(30) Foreign Application Priority Data

Oct. 23, 2007   (DE) .................. 10 2007 050 959

(51) Int. Cl.
*B29C 45/33*  (2006.01)
*B29C 45/44*  (2006.01)

(52) U.S. Cl. ......... 425/438; 425/443; 425/556; 425/577; 425/DIG. 58

(58) Field of Classification Search .................. 425/438, 425/441, 443, 556, 577, DIG. 5, DIG. 58
See application file for complete search history.

(56) References Cited

U.S. PATENT DOCUMENTS

| 548,895 | A | * | 10/1895 | Staples .................... 425/422 |
| 4,362,291 | A | * | 12/1982 | Fuke et al. ................ 249/144 |
| 4,383,819 | A | * | 5/1983 | Letica ....................... 425/577 |
| 6,767,201 | B2 | * | 7/2004 | Zuffa ........................ 425/350 |

FOREIGN PATENT DOCUMENTS

| DE | 34 39 212 | | 2/1986 |
| EP | 000665090 | A2 * | 8/1995 |
| EP | 1 243 398 | | 9/2002 |
| EP | 1 905 566 | | 4/2008 |

OTHER PUBLICATIONS

European Search Report dated Feb. 4, 2009 with English translation of relevant portion.

* cited by examiner

*Primary Examiner* — Yogendra N Gupta
*Assistant Examiner* — Emmanuel S Luk
(74) *Attorney, Agent, or Firm* — Collard & Roe, P.C.

(57) ABSTRACT

The invention relates to an injection-molding tool (1) for plastics having a tool core (3, 5), an ejector (8) and a sliding tool portion (11) for forming an undercut, each of which is displaceable, the sliding tool portion (11) being displaceable both in the push-out direction (A) of the plastics molded component (4) produced in the tool and perpendicular to this direction, while the ejector and the tool core (3, 5) are displaceable in the ejection direction (A) and both the travel of the tool core (3, 5) and that of the sliding tool portion are derived from the travel of the ejector (8).

10 Claims, 4 Drawing Sheets

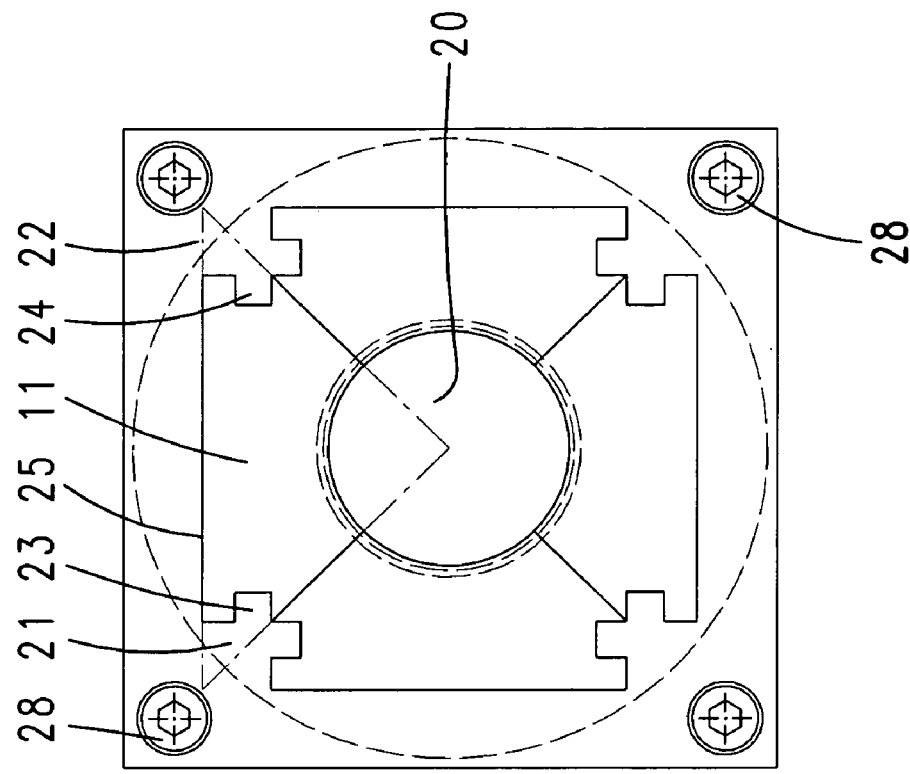
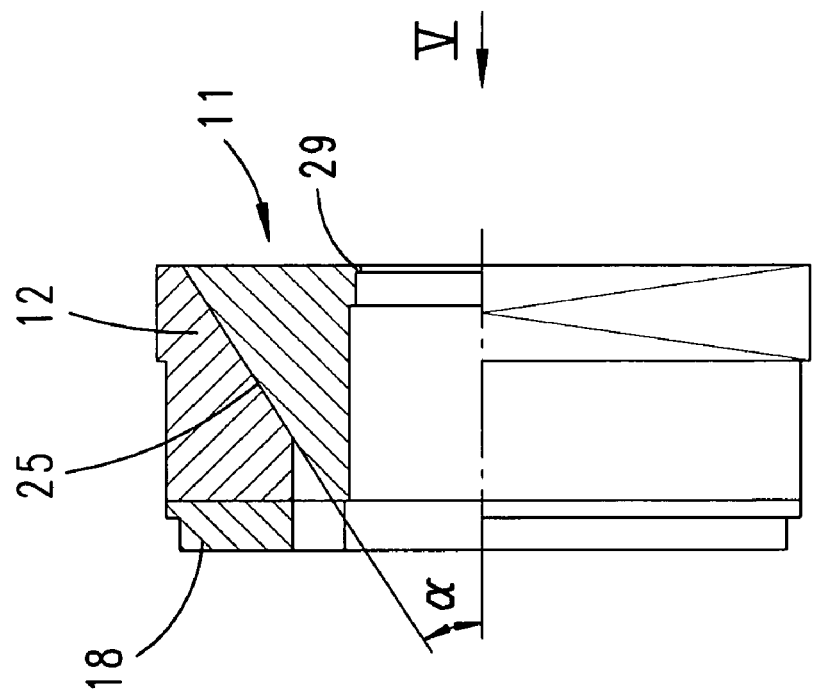

INJECTION-MOLDING TOOL

CROSS REFERENCE TO RELATED APPLICATIONS

Applicants claim priority under 35 U.S.C. §119 of German Application No. 10 2007 050 959.8 filed Oct. 23, 2007.

The invention relates to an injection-molding tool for plastics, which has, in conventional manner, a tool core, an ejector and a sliding tool portion. A sliding tool portion serves for forming an undercut on the plastics molded component. The sliding tool portion is for this purpose basically to be displaced in a direction perpendicular to the central axis of the plastics molded component.

Specifically, the invention relates to an injection-molding tool for the manufacture of screw caps, more preferably screw caps such as have a tamper-proof strip. The undercut mentioned is necessary here, for example for the transition from the lower free edge of the screw cap to the tamper-proof strip which is separate from the cap over at least a part of its periphery (the tamper-proof strip is in known manner connected to the actual screw cap by way of, for example, thin webs, tear webs, or by a predetermined separating line).

Tools of this kind with sliding tool portions are costly, because not only must a movement of the parts in the ejection direction first be undertaken, in order to eject the workpiece, but also a movement perpendicular to this, in order to move the sliding tool portion.

Starting from this point, the invention is concerned with the problem of further developing an injection-molding tool of the kind in question in such a way that the most favorable possible overall construction of the injection-molding tool is achieved.

One possible solution to this problem is given by an injection-molding tool for plastics, which has the components mentioned at the beginning, each of which is displaceable, the sliding tool portion being furthermore displaceable both in the push-out direction of the workpiece and perpendicular to this, while the ejector and the tool core are displaceable in the ejection direction, and both the travel of the tool core and that of the sliding tool portion are derived from the travel of the ejector. By virtue of the sliding tool portion being displaceable both in the ejection direction and perpendicular to this, a sloping guide can be realised, which enables a movement (specifically preferably that in the ejection direction) of the sliding tool portion by means of only one of the movement components, but at the same time enables the necessary sideways displacement for the release of the molded workpiece. By virtue of the travel of the tool core and that of the sliding tool portion being derived from the travel of the ejector, there is needed ultimately for example only one action of the ejector in order at the same time to achieve also the desired or required outward movements of the tool core and of the sliding tool portion.

Instead of the (entire) tool core, a mold portion may also be displaceable which is only for example of sleeve-like form and is located on the tool core, the rest of the tool core being however fixed. A separate mold portion of this kind is for example in particular then advantageous when a molded component with a special internal shape is to be produced, for example, in the case of a screw cap, a shape having a sealing lip (sometimes also called an "olive"), which is formed at an inward spacing from the inner face of the outer wall.

Further features of the invention are explained below, also in the description of the Figures, mostly in the preferred association with the subject matter of Claim 1, or with features of other claims. They may however also be significant in their association with only individual features of Claim 1 or those of any other claims or in each case independently.

Thus it is preferred for the ejector to be coupled for movement to the tool core by means of a molded plastics component. The respective molded plastics component effects therefore at the same time, a coupling, preferably given by a positive connection, of the ejector to the tool core. This may mean that the ejector is movable independently of the tool core, in the case of no part being molded. This coupling for movement by way of the molded component is preferably only present as long as the forces acting on the molded component by way of the ejector are less that the forces required to push out the molded component from the tool core.

A further preferred feature is given by the tool core, in order to interact with the sliding tool portion, carrying along a coupling part during outward travel. The tool core does not therefore in this case act directly on the sliding tool portion, but by way of an intermediately-positioned further part. By virtue of this, it is for example relatively easily achieved in structural terms that the sliding tool portion, which is at least in part also located radially outside the ejector, can be carried along at the same time by the tool core that is located radially inside the ejector portion.

For this, it is further preferred for the tool core and the coupling part to interact by way of a positive connection.

The ejector itself is suitably to be actuated by way of an ejector pin. In this case, the ejector may be of sleeve-like form and also to be actuated only by way of an ejector pin. It may however also be actuated by way of several ejector pins and/or it may be formed in a multipart arrangement, over the periphery. The ejector pin may be disposed directly on the tool itself and be driven, preferably hydraulically or pneumatically. This can avoid having to provide a suitable drive and/or therefore corresponding mounting of such a drive in the injection-molding machine.

The ejector pin suitably travels likewise also (only) in the ejection direction.

In this case, it is further preferred for the ejector pin to coupled to the ejector for to and fro movement, for example by a screw connection. The ejector can therefore also be pulled back again after ejection of a molded component has taken place. In so far as the ejector also carries the tool core along, suitably by way of a positive connection, in the direction of the return movement, the tool core is also pulled back at the same time by this.

In regard to the sliding tool portion, active pulling-back is not required. The return movement of the sliding tool portion is in fact preferably achieved by engagement of the oppositely-located tool portion during closing of the tool.

In further detail, the sliding tool portion is preferably constrained on a guide part, which defines a sloping guide. This sloping guide prescribes the angle in which the sliding tool portion moves during de-molding. There is in question, in cross-section, an acute angle with respect to the said elongate axis of the tool core (enclosed between a sloping guide plane and the said elongate axis). The acute angle $\alpha$ is between 0 and 90°, the exact degree values of 0 and 90° not being included. Preferably the acute angle is between 100 and 60°; all intermediate values, starting from the 0 to 90° mentioned, in particular however in respect of the preferably specified regions, not only the full degree values, but also minutes and seconds of angle, being included, as is displacement of the boundaries of the regions from above or from below by one or more of the said values or intermediate values. Preferably, the angle is between 15° and 25°.

In particular, the sliding tool portion is constrained on the guide part by a penetrating guide feature. This penetrating guide arrangement preferably also has an undercut in the direction of a longitudinal central axis of the tool core.

It is further preferred for a plurality of sliding tool portions to be distributed circumferentially with respect to the longitudinal central axis of the tool core.

The invention is explained further hereinbelow on the basis of the accompanying drawing, which however illustrates only one exemplary embodiment of the invention, and in which:

FIG. 4 is a partially sectioned illustration of the sliding tool portion with a guide part; and FIG. 5 is a plan view of the arrangement according to FIG. 4, seen in the direction of the arrow V in FIG. 4.

Figure 1:
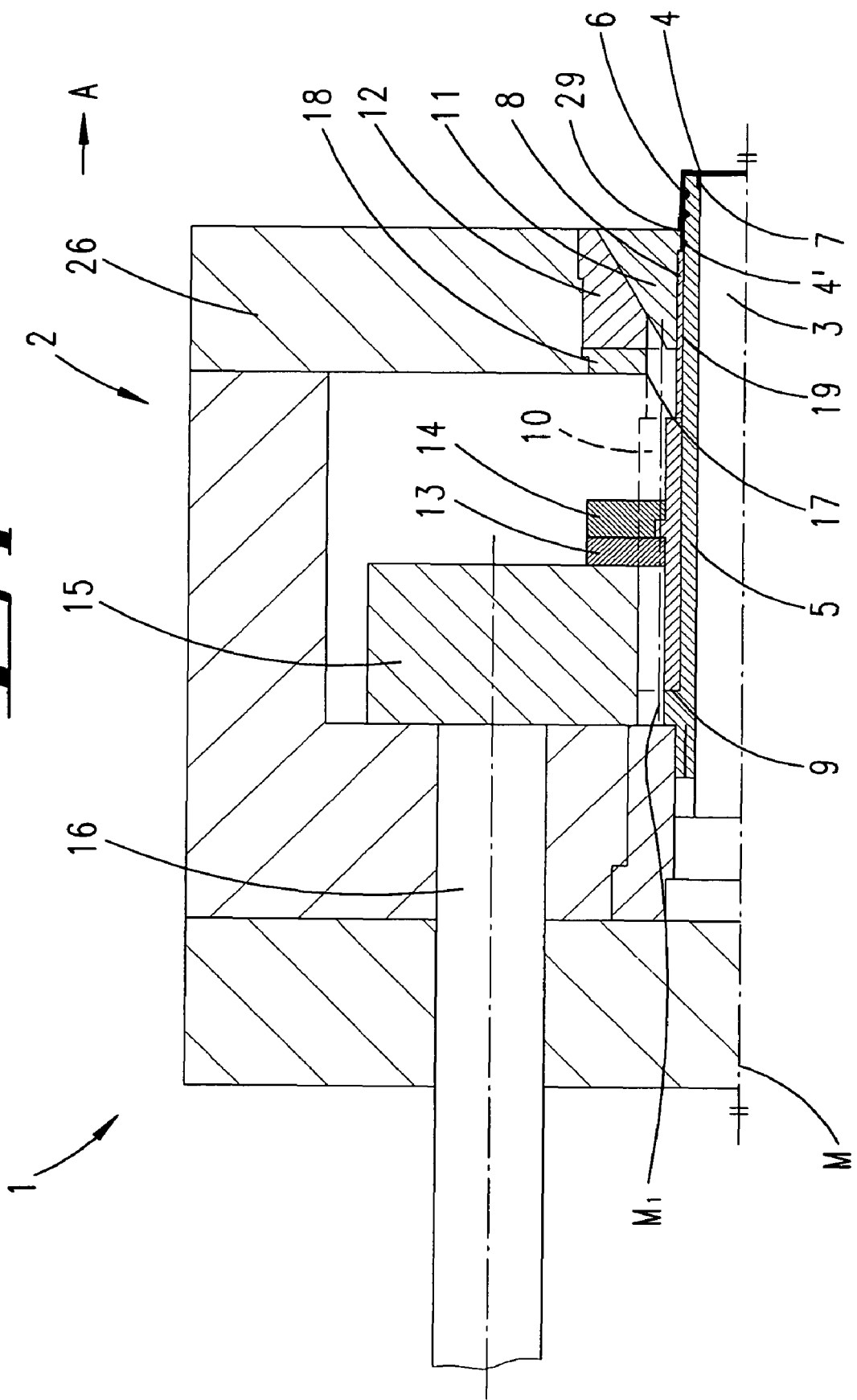
FIG. 1 shows a schematic cross-sectional view of one mold half of an injection-molding tool for plastics having a tool core, an ejector and a sliding tool portion, after molding of a screw cap and when a second mold half has already been moved away.

An injection-molding tool 1 for plastics, only one mold half 2 of which is illustrated, is shown and described.

The mold half 2 has a tool core 3, which, in the exemplary embodiment, reproduces the internal geometry of a plastics screw cap 4 which is to be injection-molded there. For this, the tool core 3, which is basically fixed in the exemplary embodiment illustrated, has in further detail a mold portion 5, which is displaceable relative to the core, the portion 5 specifically forming the internal thread 6 and the shape of the sealing lip 7 that faces the internal thread 6.

As is apparent from the center line M, the parts illustrated are basically formed to be rotationally symmetrical. The mold portion 5 is thus a sleeve part, while the actual tool core 3 may otherwise be formed in the manner of a die. If the mold portion 5 is not present, when therefore for example no sealing lip 7 is to be formed, the tool core 3 is as a rule arranged to be displaceable.

The ejector 8 is located radially outside the mold portion 5. The ejector 8 is likewise configured as a sleeve. The ejector 8 is displaceable relative to the tool core 3 in an ejection direction A. Starting from the position according to FIG. 1, the ejector cannot be displaced relative to the tool core 3 in a direction opposite to the ejection direction A, but rather abuts against the inner side of a positively acting projection 9 of the tool core 3, especially at the embodiment of the mold portion 5.

"Inner side" here means in the inward direction of the tool, thus in the opposite direction to the ejection direction A.

A coupling part 10 is located further radially outward of the ejector 8, the coupling part being suitable for coupling together for movement the tool core 3, i.e. in the exemplary embodiment specifically the mold portion 5, and the sliding tool portion 11. Also, this coupling part 10, which in the exemplary embodiment is formed as a rod or pin, is carried along by the tool core 3, or, in the exemplary embodiment, by the mold portion 5, since the tool core 3 is here stationary, by means of the positively acting projection 9. This is so in the case of the exemplary embodiment because the coupling part 10, as is apparent from the central axis $M_1$, in part passes through the ejector 8.

The sliding tool slider portion 11 is coupled to a stationary guide part 12, as is further explained below in detail.

The ejector 8 is fixedly connected to an ejector plate 15 by means of securing parts 13, 14. This ejector plate 15 is in turn acted on by an ejector pin 16, the ejector pin 16 being also fixedly connected to the ejector plate 15.

FIG. 1 shows the situation when the injection-molding tool 1 has already been opened. That is to say, a second mold half, not illustrated, has already moved away in the ejection direction A.

The molded screw cap 4 is exposed, apart from the molded-on tamper-proof strip 4'. It can be seen that the sliding tool portion 11 projects by way of an extension portion 29 between the tamper-proof strip 4' and the wall of the screw cap 4 located above it in the ejection direction. At the same time, the ejector 8 engages against the plastics molded component 4 on the underside of the tamper-proof strip.

Figure 2:
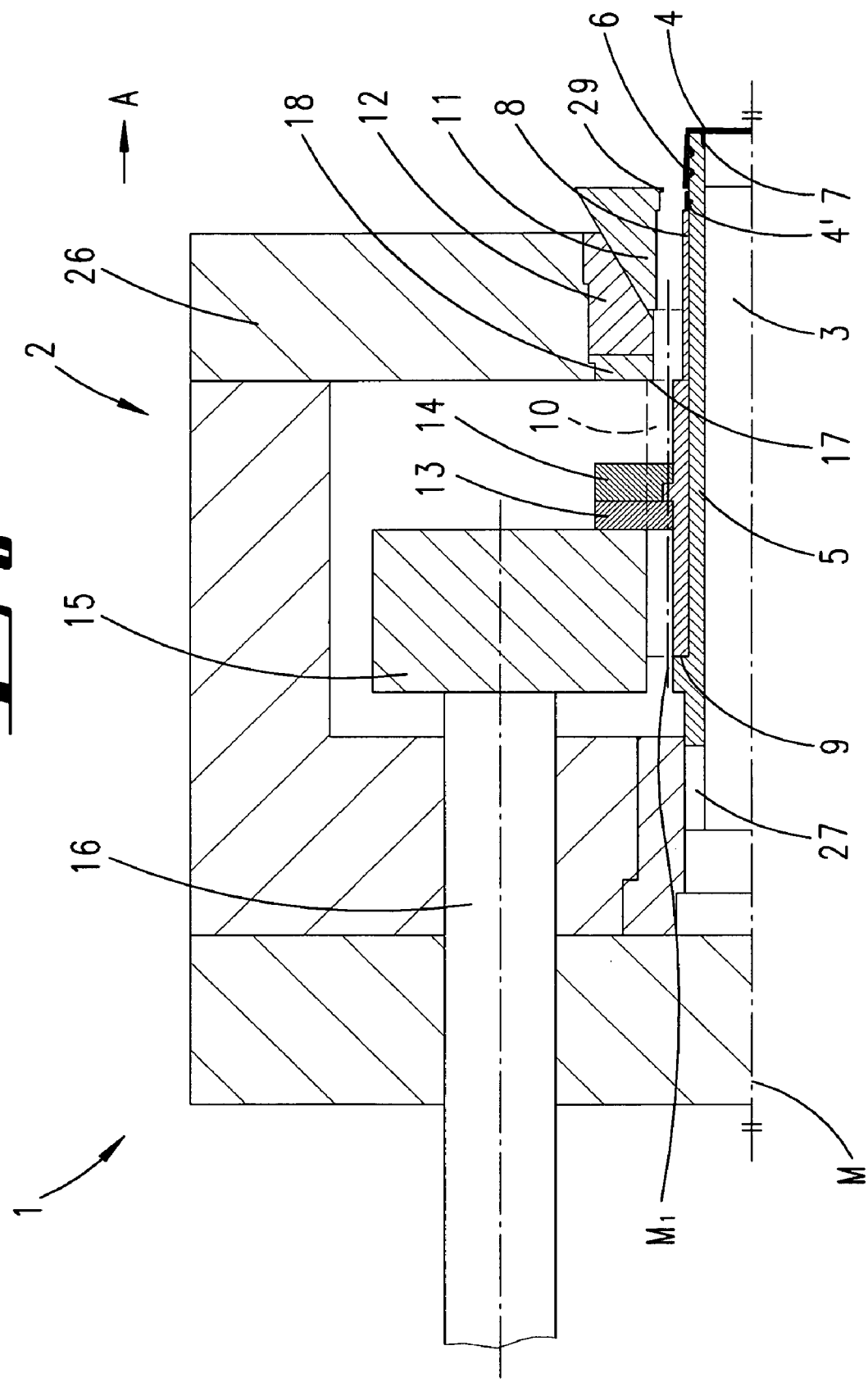
FIG. 2 shows the unit according to FIG. 1 after travel of the tool core in the ejection direction and simultaneous slantways travel of the sliding tool portion.

In the illustration according to FIG. 2, the ejector 8 has now traveled in the ejection direction A by virtue of being acted on by the ejector pin 16. On account of the engagement against the plastics molded component 4, the ejector 8 has in this way carried the mold portion 5 along with it. At the same time, the ejector 8 has carried the coupling part 10 along with it, via the tool core 3, the described positively-acting engagement on account of the positively-acting projection 9, and the coupling part has moved the sliding tool portion 11 by engagement on the underside of this, specifically on account of the sloping guidance applied to the sliding tool portion 11, both radially outward and in the ejection direction A.

Figure 3:
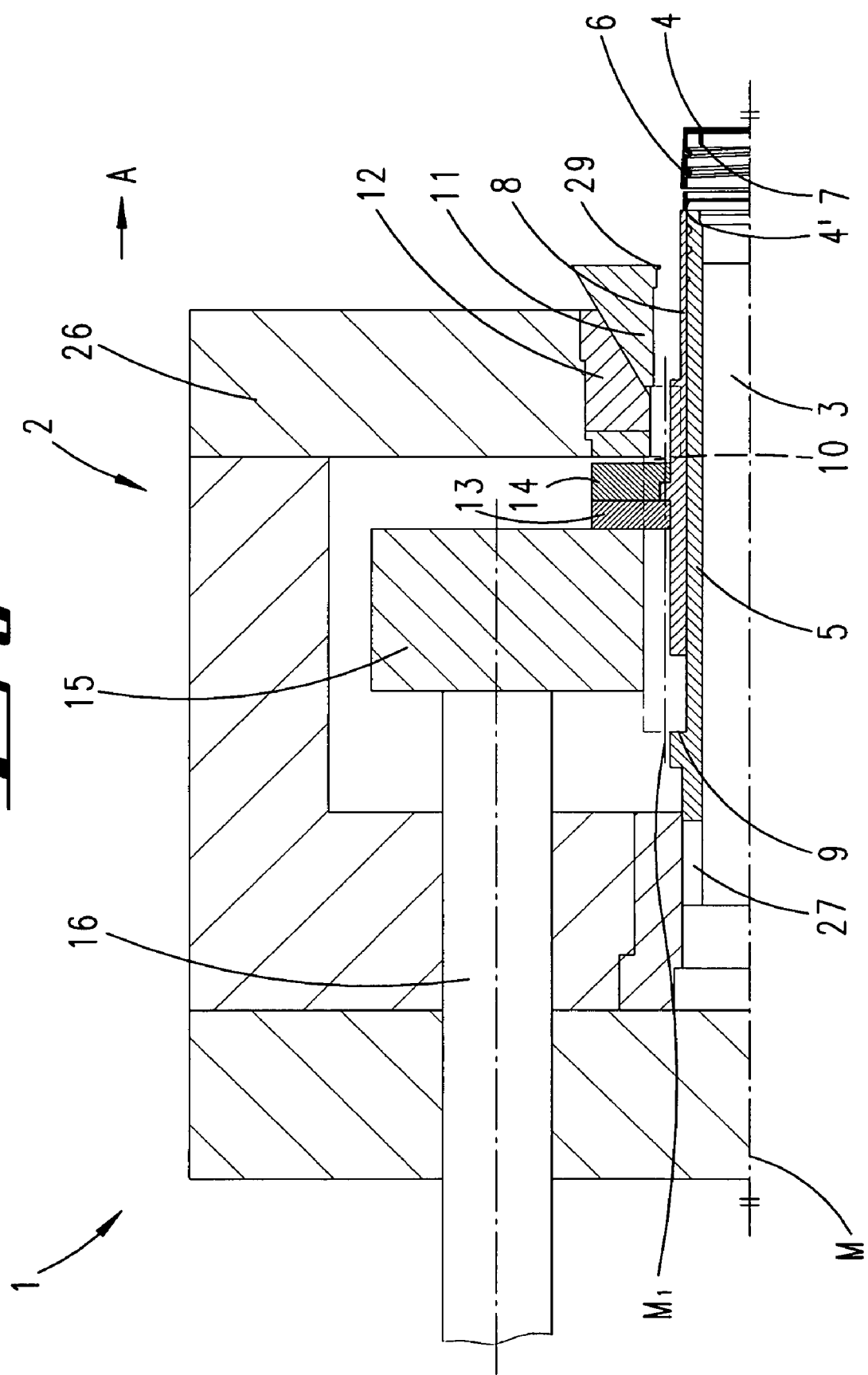
FIG. 3 shows the unit according to FIG. 2 after further travel of the ejector with the plastics screw cap illustrated ejected from the tool core.

The illustration according to FIG. 3 shows that after further advancing action by the ejector 8 via the ejector rod 16, the screw cap 4 (which here is shown as if it were "floating", purely for purposes of illustration; naturally it falls instead downward immediately after ejection is completed) is pushed out of the tool core 3. The tool core, or specifically the mold portion 5 in the exemplary embodiment, may, as compared with the position according to FIG. 2, not fully complete a further movement in the ejection direction A, since it is blocked by the coupling part 10 against movement in this direction after reaching the position according to FIG. 2. The coupling part 10 has for this purpose in particular an abutment collar 17, which in this position engages against an abutment part 18 associated with the guide part 12, the abutment part 18 being fixed to the tool.

It is to be seen that the coupling part 10, which is here formed in the manner of a pin, is exposed at its rear, in the region of the positively acting projection 9 of the tool core, specifically of the mold portion 5. In regard to the ejector 8, which is formed as a sleeve, a peripheral connection in the forward portion 19 is sufficient. Depending on the configuration, a connection may also remain however in the rearward region.

The sliding tool portion 11 is shown in further detail in FIGS. 4 and 5, in interaction with the guide part 12.

It can be seen that in the exemplary embodiment, several sliding tool portions 11, specifically four, are provided, which come together to form a closed inner circumference when they have traveled inward, i.e. in the situation according to FIG. 1, as it is shown in FIG. 5.

The sliding tool portions 11 have very basically, in the view according to FIG. 5, a triangular outline, the tip 20, which is as it were theoretically defined and is shown chain-dotted in FIG. 5, being removed so that the outer circumference of the molded component to be produced is achieved. For the rotationally symmetrical configuration that thus results, the tip 20 is therefore in this illustration removed so that the superimposed circular configuration of the molded component results.

To the rear or radially outwardly, respective tip regions 21 and 22 are removed in favor of a guide engagement on the guide part 12. The guide part 12 has, as is apparent, for this purpose guide tongues 23, 24, which engage against one or both of the sliding tool parts 11 in suitable grooves of the sliding tool portions 11, in each case oppositely located in the foot region of the triangle mentioned. Furthermore, the guide part 12 defines a sloping guide plane 25, see also FIG. 4, on which the sliding tool portion 11 travels in face-to-face engagement.

The sloping guide plane 25, see in particular also FIG. 4, encloses with the center axis M in the sectional illustration shown, an acute angle α. The acute angle α is in the exemplary embodiment 32°.

It is important that because of the configuration given for the injection-molding tool described, maintenance can be carried out very conveniently. After release of for example a screw connection between the guide part 12 and the surrounding tool part 26, the abutment part 18 is accessible, this for its part preferably being screw-connected to the guide part 12. The guide part 12 can then be taken out together with the abutment part 18 and the sliding tool portion 11. After such removal, the parts 5, 8, 10, 13 and 14 are accessible and may be removed, following which the tool core, the ejector and the sliding tool portion 11 (already previously removed) are accessible for maintenance or exchange without further ado. The tool core part 3, which is fixed in the exemplary embodiment, may also be provided so that it can be readily removed for maintenance purposes, for example by way of a latching or screw connection.

In further detail, the guide part 12 is screwed to the tool part 26, specifically in the exemplary embodiment by means of the four screws 28 to be seen in FIG. 5. The screws 28 are disposed, as is shown, in the corner regions of the guide part 12, which have a corresponding protruding portion, so that the screws can engage directly into the tool part 26.

It is further to be noted that the ejector 8 may in addition be acted on in an assisting manner at its foot in the region 27, for example, by a spring or also pneumatically or hydraulically, i.e. by compressed air or by other pressure means, in order to assist the movements mentioned.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

The invention claimed is:

1. Injection-molding tool for plastics having a tool core, an ejector and a sliding tool portion for forming an undercut, each of which is displaceable, the ejector being movable independently of the tool core when no part is being molded, the sliding tool portion being displaceable both in the push-out direction of the plastics molded component produced in the tool and perpendicular to this direction, while the ejector and the tool core are displaceable in the ejection direction and both the travel of the tool core and that of the sliding tool portion are derived from the travel of the ejector.

2. Injection-molding tool according to claim 1, wherein the ejector is coupled for movement to the tool core via a molded plastics component.

3. Injection-molding tool according to claim 1, wherein the tool core, in order to interact with the sliding tool portion, carries along a coupling part during outward travel.

4. Injection-molding tool according to claim 1, wherein the tool core and the coupling part interact by way of a positive connection.

5. Injection-molding tool according to claim 1, wherein the ejector is actuated by way of an ejector pin.

6. Injection-molding tool according to claim 1, wherein the ejector pin likewise travels in the ejection direction.

7. Injection-molding tool according to claim 1, wherein the ejector pin is coupled to the ejector for to and fro movement.

8. Injection-molding tool according to claim 1, wherein sliding tool portion is constrained on a guide part, which defines a sloping guide.

9. Injection-molding tool according to claim 1, wherein the constraint is achieved by a penetrating guide feature, which has an undercut in the direction of a longitudinal central axis of the tool core.

10. Injection-molding tool according to claim 1, wherein a plurality of sliding tool portions are distributed circumferentially with respect to the longitudinal central axis of the tool core.

* * * * *